Jan. 27, 1953 C. A. DOBRINICH, JR 2,626,468
ROOT RIPPING ATTACHMENT FOR BULLDOZERS
Filed June 13, 1950 2 SHEETS—SHEET 1
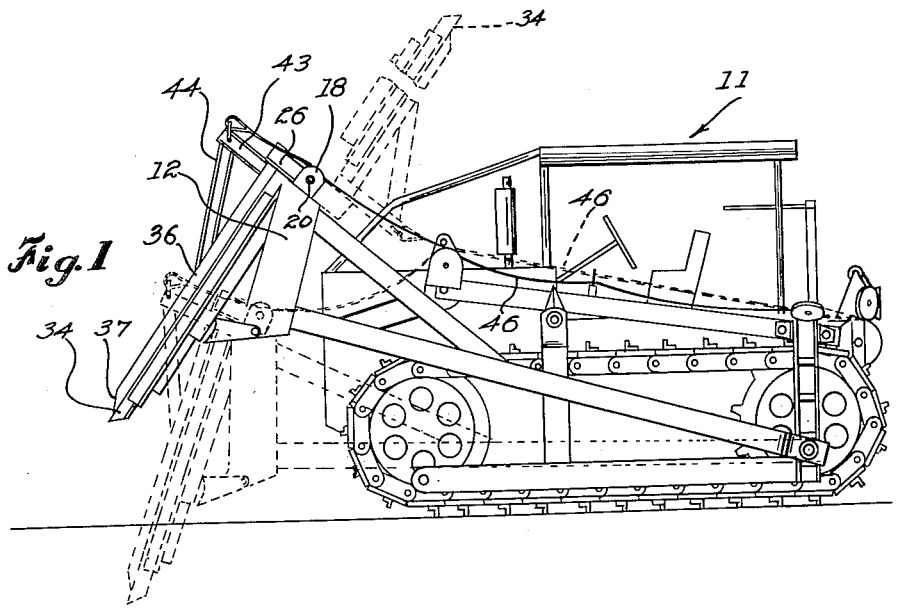
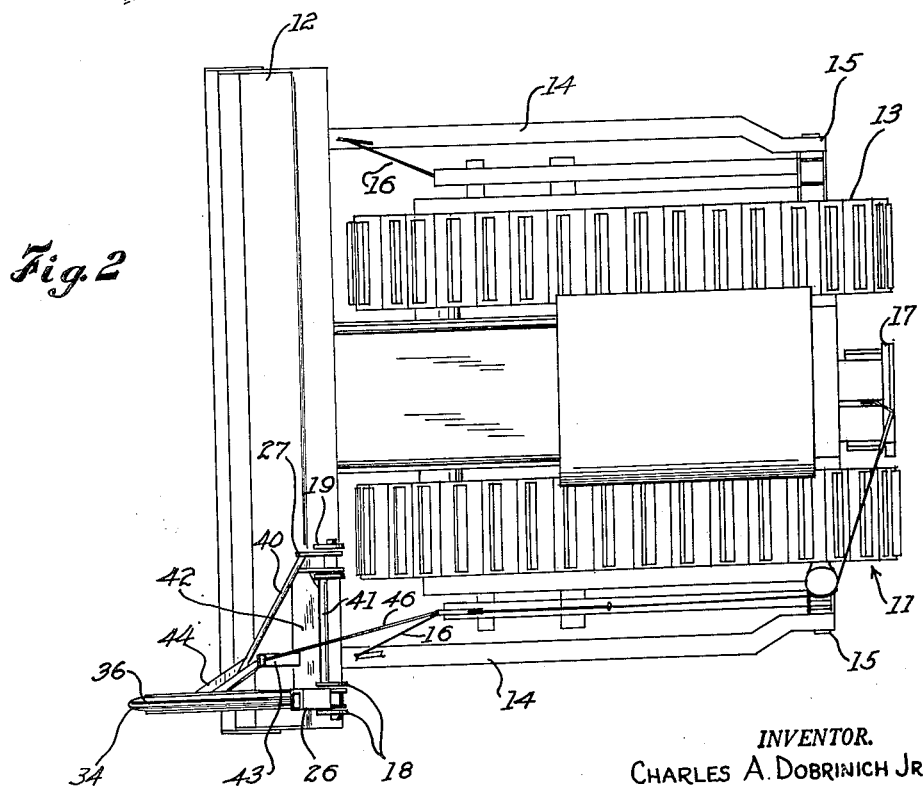
INVENTOR.
CHARLES A. DOBRINICH JR.
BY
*McMorrow, Berman + Davidson*
ATTORNEYS Jan. 27, 1953 C. A. DOBRINICH, JR 2,626,468
ROOT RIPPING ATTACHMENT FOR BULLDOZERS
Filed June 13, 1950 2 SHEETS—SHEET 2
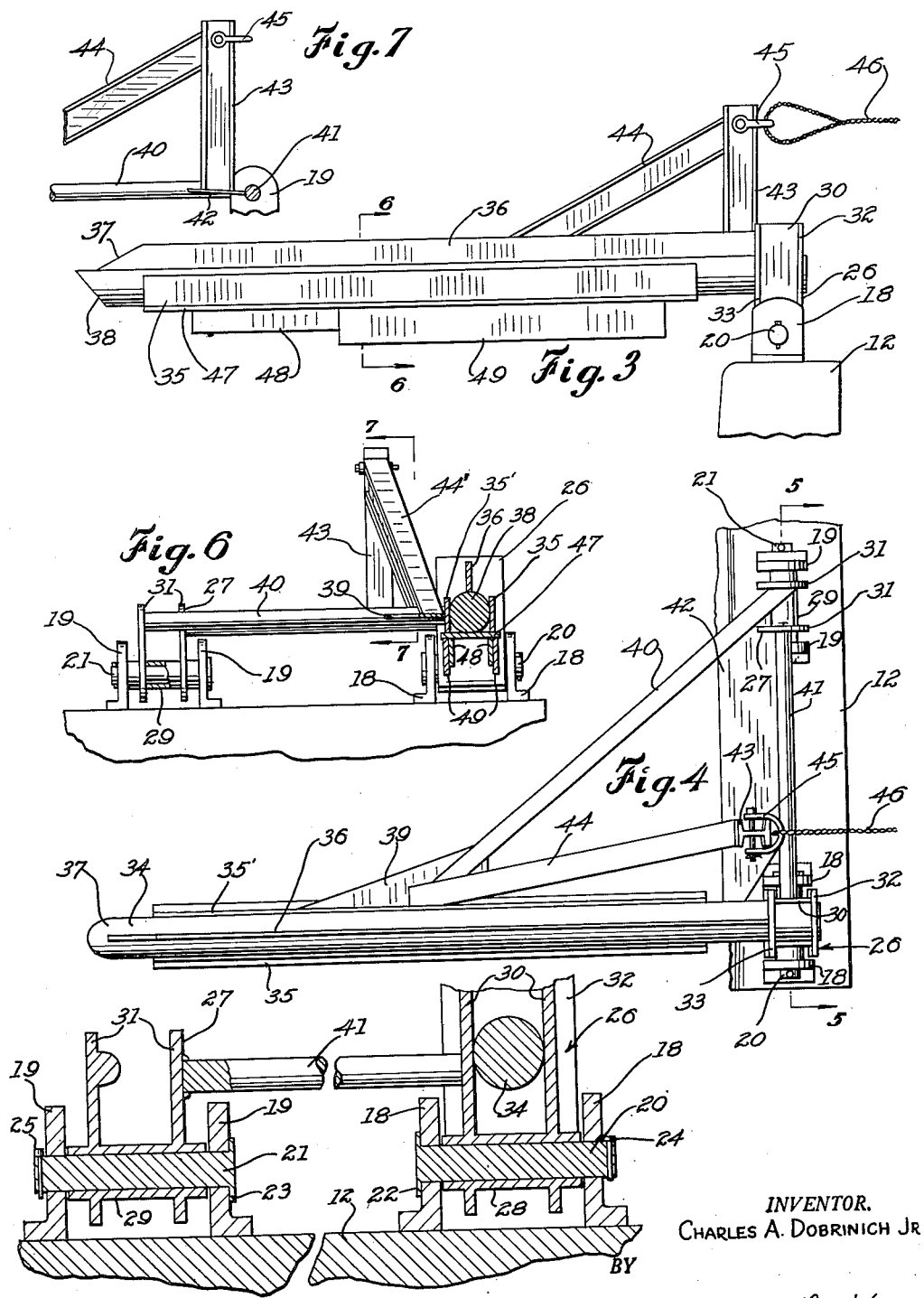
INVENTOR.
CHARLES A. DOBRINICH JR
BY
McMorrow, Berman + Davidson
ATTORNEYS Patented Jan. 27, 1953

2,626,468

UNITED STATES PATENT OFFICE 2,626,468

ROOT RIPPING ATTACHMENT FOR BULLDOZERS

Charles A. Dobrinich, Jr., Staunton, Ill.

Application June 13, 1950, Serial No. 167,853

3 Claims. (Cl. 37—2)

This invention relates to bulldozer attachments, and more particularly to a device for severing underground roots of trees or stumps in land clearing operations.

A main object of the invention is to provide a novel and improved root cutting attachment for a bulldozer blade, said attachment being simple in construction, involving only a few parts, and being easy to install on the bulldozer blade.

A further object of the invention is to provide an improved root cutting attachment adapted to be mounted on the top edge of a bulldozer blade, said attachment being readily movable from an operative position to an inoperative position out of the way of the bulldozer blade, the device being controllable either by power or by hand, allowing the bulldozer to be employed for its normal uses when the device is in its inoperative position and providing a great saving in the amount of time required in removing tree stumps, trees, and the like in land clearing operations.

Further objects and advantages of the invention will become apparent from the following description and claims, and from the accompanying drawings, wherein:

Figure 1 is a side elevational view of a bulldozer whose blade is provided with an improved root cutting attachment constructed in accordance with the present invention, Figure 2 is a top plan view of the bulldozer of Figure 1 showing the improved root cutting attachment of the present invention, Figure 3 is an enlarged side elevational detail view of the root cutting attachment of the present invention, the arm of the attachment being shown in horizontal position, Figure 4 is an enlarged top plan detail view of the root cutting attachment, as employed in Figures 1 and 2, Figure 5 is an enlarged cross sectional detail view taken on line 5—5 of Figure 4, Figure 6 is an enlarged cross sectional detail view taken on line 6—6 of Figure 3, and Figure 7 is a cross sectional detail view taken on line 7—7 of Figure 6.

Referring to the drawings, 11 generally designates a conventional bulldozer provided with the usual bulldozer moldboard, shown at 12.

The bulldozer 11 comprises the usual tractor 13, and the upstanding transversely disposed moldboard 12 is connected to the rear portion of the tractor 13 by longitudinal beams, shown at 14, 14, said beams being pivoted at one end as at 15, 15 to the tractor frame and having the lower end of the moldboard fixedly secured to the other ends of the beams, whereby the moldboard 12 may be elevated. Elevation of the moldboard 12 is accomplished by the usual cables 16, 16 which are connected to the beam members 14, 14 and which extend over pulleys not shown, to the usual winch provided at the rear portion of the tractor, said winch being shown generally at 17.

Secured on the upper end of the moldboard 12 adjacent one side thereof are the spaced upstanding bearing brackets 18, 18. Designated at 19, 19 are another pair of upstanding bearing brackets secured on the upper end of the moldboard 12 a short distance inwardly of the brackets 18, 18. Extending through the respective pairs of bearing brackets 18, 18 and 19, 19 are the respective shaft elements 20, 21, said shaft elements being in alignment and being spaced a short distance above the top edge of the moldboard. The shaft elements are provided with headed ends, shown respectively at 22 and 23, the opposite ends of the shaft elements being provided with the securing pins, shown at 24 and 25, which lock the shaft elements in the respective pairs of bearing brackets.

Rotatably mounted on the shaft elements 20 and 21 are the respective bracket members 26, 27, said bracket members comprising sleeve portions 28 and 29 rotatably mounted on the shaft members 20 and 21, as shown in Figure 5. Secured to the sleeve member 28 are the parallel web elements 30, 30, and secured to the sleeve member 29 are the parallel web elements 31, 31. Secured to the edges of the web elements 30, 30 are the flanges 32, 33, providing a substantially box-shaped cross section for the bracket member 26.

Designated at 34 is an elongated arm which extends through the flanges 32 and 33 and is secured thereto, said arm being received between the webs 30, 30 and being preferably welded to said webs as well as to the flanges 32, 33. As shown in Figure 3, the connection of the arm 34 to the bracket member 26 is located a short distance from the shaft member 20, the arm 34 being perpendicular to the axis of said shaft member. Welded to the sides of the elongated arm 34 are the respective stiffening bars 35, 35', and secured to the elongated arm 34 in the plane of rotation thereof is an elongated blade member 36 extending substantially for the full length of the arm 34 and terminating at its forward end in a bevel 37. The end of the arm 34 is also bevelled, as shown at 38. Secured to the stiffening bar 35' at its intermediate portion is a plate member 39, and connecting said plate member 39 to the bracket member 27 is a diagonal bar member 40.

Designated at 41 is a tie bar member connecting the bracket members 26 and 27 and extending parallel to the top edge of the moldboard 12. The bar member 41 is in the same plane as the arm 34 and the bar 40, and connecting the bar member 41 to said arm 34 and bar 40 is a plate member 42. Secured to said plate member 42 is an upstanding post member 43, the top end of said post member being braced by being connected to the plate member 39 by an inclined brace bar 44. Pivotally connected to the top end of the post member 43 is a U-shaped loop member 45. Connected to said loop member 45 is a cable 46 which extends rearwardly over suitable pulleys to one of the drums of the winch apparatus 17 of the tractor, said one of the drums being controllable independently of the portion of the winch apparatus which is connected to the cables 16, 16.

As shown in Figures 1 and 2, the root cutting attachment may be supported in an inoperative position, shown in dotted view in Figure 1, wherein the arm 34 projects upwardly and rearwardly with the moldboard 12 in raised position. When the moldboard 12 is lowered to working position, the arm 34 will remain in said upwardly projecting inoperative position, allowing the bulldozer moldboard to be employed for its normal purposes.

Assuming that it is desired to employ the root cutting attachment for severing roots or other underground obstructions, the arm 34 is rotated from its dotted line position shown in Figure 1, to its full line position shown in said figure by manually raising the cable 46, whereby the arm 43 will be rotated counter-clockwise, as viewed in Figure 1 to a position wherein the arm 34 will descend by gravity to its full line position shown in Figure 1. The moldboard 12 is then lowered to its dotted line position shown in Figure 1, whereby the free end of the arm 34 and the end of the blade 36 penetrate into the ground by the weight placed thereon. When the bulldozer is driven forwardly, the arm 34 bears against the front surface of the moldboard 12, whereby said arm is held in a downwardly directed position, and whereby underground roots or other obstructions in the path of the arm and blade 36 are severed.

When it is desired to raise the root cutting attachment to an inoperative position, the tractor is backed up, bringing the arm 34 up out of the ground, whereby the point thereof drags on the ground, and then the arm 34 is rotated clockwise by operating the associated winch drum of the winch apparatus 17 whereby tension is provided in the cable 46. When the arm 34 has been raised to a substantially vertical position, the winch 17 is deenergized, allowing the arm to continue its rotation clockwise to the dotted line position of Figure 1 by momentum.

As shown in Figures 3 and 6, the arm 38 may be stiffened by securing longitudinal bar members 47, 48, and 49 to the arm 38 in the manner shown in Figures 3 and 6 to define a double channel cross section with respect to the stiffening bars 35, 35'.

While a specific embodiment of an improved root cutting attachment for use on a bulldozer has been disclosed in the foregoing description, it will be understood that various modifications within the spirit of the invention may occur to those skilled in the art. Therefore it is intended that no limitations be placed on the invention except as defined by the scope of the appended claims.

What is claimed is:
1. In combination, a bulldozer moldboard, a longitudinal beam secured to said moldboard, a first pair of spaced bearing brackets secured to the upper end of the moldboard adjacent one side thereof, a second pair of spaced bearing brackets secured to said upper end, respective support members hinged to said pairs of bearing brackets for rotation around a common axis above and parallel to said upper end, frame means rigidly connecting said support members, an elongated arm secured to the support members associated with the first pair of bearing brackets, said arm extending in a plane transverse to said upper end and being substantially longer than the height of the moldboard, said arm being offset from said axis and being arranged for engagement with the front surface of the moldboard, a cutting blade carried by said arm in the plane of rotation thereof and located on the side of said arm opposite said axis, and a bracket member secured to said frame means and arranged to extend forwardly and upwardly from the moldboard when the arm is in engagement with the moldboard front surface, said bracket member being in the same longitudinal plane as said longitudinal beam.

2. The combination with a tractor including a frame, a pair of beams arranged longitudinally of said frame and having one end connected to said frame for pivotal movement about a horizontal axis, and an upstanding moldboard arranged transversely of said beams adjacent the other ends of the latter and having the lower end fixedly secured to the other ends of said beams, of a root cutting attachment operatively connected to the upper end of said moldboard adjacent one side of the latter, said attachment comprising a support means rotatable in counterclockwise and clockwise directions positioned in longitudinal spaced relation with respect to and carried by the upper end of said moldboard adjacent one side of the latter, an arm arranged transversely of said support means and having one end connected to the latter means for rotation therewith, a cutting element arranged longitudinally of and projecting from said arm, and means operatively connected to said support means for effecting the rotational movement of the latter.

3. The combination with a tractor including a frame, a pair of beams arranged longitudinally of said frame and having one end connected to said frame for pivotal movement about a horizontal axis, and an upstanding moldboard arranged transversely of said beams adjacent the other ends of the latter and having the lower end fixedly secured to the other ends of said beams, of a root cutting attachment operatively connected to the upper end of said moldboard adjacent one side of the latter, said attachment comprising a plurality of upstanding brackets arranged in longitudinal spaced relation along the upper end of said moldboard adjacent one side of the latter and carried by the upper end of said moldboard, a support means rotatable in counterclockwise and clockwise directions positioned longitudinally of the upper end of said moldboard and carried by said brackets, an arm arranged transversely of said support means and having one end connected to the latter means for rotation therewith, a cutting element arrange longitudinally of and projecting from said arm, and means operatively connected to said support means for effecting the rotational movements of the latter.

CHARLES A. DOBRINICH, Jr.

REFERENCES CITED

The following references are of record in the file of this patent:

UNITED STATES PATENTS

| Number | Name | Date |
| --- | --- | --- |
| 2,262,415 | Williams et al. | Nov. 11, 1941 |
| 2,281,928 | Fletcher | May 5, 1942 |